US007709072B2

(12) United States Patent
Caveney et al.

(10) Patent No.: US 7,709,072 B2
(45) Date of Patent: May 4, 2010

(54) ADHESIVE PATTERN FOR A LABEL SYSTEM

(75) Inventors: Jack E. Caveney, Hinsdale, IL (US); Barry O. Page, Woodstock, GA (US); David P. Newman, Glen Ellyn, IL (US)

(73) Assignee: Panduit Corp., Tinley Park, IL (US)

(*) Notice: Subject to any disclaimer, the term of this patent is extended or adjusted under 35 U.S.C. 154(b) by 0 days.

(21) Appl. No.: 10/739,626

(22) Filed: Dec. 18, 2003

(65) Prior Publication Data

US 2004/0128893 A1 Jul. 8, 2004

Related U.S. Application Data

(60) Provisional application No. 60/435,570, filed on Dec. 20, 2002.

(51) Int. Cl.

| | |
|---|---|
| ***B32B 9/00*** | (2006.01) |
| ***B32B 33/00*** | (2006.01) |
| ***B32B 23/02*** | (2006.01) |
| ***B32B 7/14*** | (2006.01) |
| ***B32B 7/06*** | (2006.01) |
| ***B32B 27/32*** | (2006.01) |
| ***B42D 15/00*** | (2006.01) |

(52) U.S. Cl. .................... 428/40.1; 428/42.1; 428/42.2; 428/192; 428/201; 428/202; 428/220; 283/81

(58) Field of Classification Search ................ 428/40.1, 428/42.1, 42.2, 192, 194, 201, 202, 220; 283/81

See application file for complete search history.

(56) References Cited

U.S. PATENT DOCUMENTS

| | | | | |
|---|---|---|---|---|
| 4,391,853 | A * | 7/1983 | Pointon | 427/152 |
| 4,578,136 | A * | 3/1986 | Brown | 156/249 |
| 5,284,689 | A | 2/1994 | Laurash et al. | |
| 5,351,426 | A * | 10/1994 | Voy et al. | 40/638 |
| 5,691,437 | A | 11/1997 | Main | |
| 5,702,789 | A * | 12/1997 | Fernandez-Kirchberger et al. | 428/40.1 |

OTHER PUBLICATIONS

Hellermann Tyton's 606 Basic Plus labeling sheet, 2 pages, date unknown.

Brady Worldwide's LAT-177-124 labeling sheet, 1 page, date unknown.

Brady Worldwide's LAT-47-707 labeling sheet, 1 page, date unknown.

* cited by examiner

*Primary Examiner*—Victor S Chang

(74) *Attorney, Agent, or Firm*—Robert A. McCann; Christopher S. Clancy; James H. Williams

(57) ABSTRACT

An adhesive pattern for a label system is disclosed. The adhesive pattern includes a label sheet having a plurality of non-adhesive sections, and a plurality of adhesive sections connected to the non-adhesive sections. The non-adhesive sections and the adhesive sections are in alternate arrangement to form the label sheet. The label sheet also includes a plurality of labels having a first end and a second end, and the first end is attached to a non-adhesive section. Upon removal of the label from a non-adhesive section, the label has a non-sticking surface.

12 Claims, 7 Drawing Sheets

ADHESIVE PATTERN FOR A LABEL SYSTEM

CROSS-REFERENCE TO RELATED APPLICATIONS

This application claims priority to U.S. Provisional Application Ser. No. 60/435,570, filed on Dec. 20, 2002, the entirety of which is hereby incorporated by reference.

BACKGROUND OF THE INVENTION

The present invention is directed to an adhesive pattern for a label system, and more particularly, to an adhesive pattern for labeling faceplates, surface mount boxes, patch panels and marker ties.

Adhesive patterns for labeling a 24-port or 48-port installation with one sheet have been utilized in the telecommunications industry. For example, Hellermann Tyton's 606Basic Plus package utilizes different label sizes on one sheet to label a 24-port or 48-port installation. Moreover, adhesive label sheets having only one size label placed thereon are also known. However, none of the prior label sheets have utilized the same adhesive pattern on sheets of one-port, two-port, three-port, four-port and six-port labels, each sheet having only one label size, as well as on sheets having a combination of different label sizes.

SUMMARY OF THE INVENTION

It would be desirable to provide an adhesive pattern utilized on sheets of one-port, two-port, three-port, four-port and six-port labels, each sheet having only one label size.

It would also be desirable to provide the same adhesive pattern utilized on sheets having a combination of different label sizes, such as one-port, two-port, three-port, four-port and six-port labels.

An adhesive pattern for a label system is disclosed. The adhesive pattern includes a label sheet having a plurality of non-adhesive sections, and a plurality of adhesive sections connected to the non-adhesive sections. The non-adhesive sections and the adhesive sections are in alternate arrangement to form the label sheet. The label sheet also includes a plurality of labels having a first end and a second end, and the first end is attached to a non-adhesive section. Upon removal of the label from a non-adhesive section, the label has a non-sticking surface.

Preferably, the second end of each label is attached to an adhesive section. Alternatively, the second end of each label may be attached to a non-adhesive section.

Preferably, the label sheet comprises only one label size. Alternatively, the label sheet may comprise more than one label size.

Preferably, the labels are one-port, two-port, three-port, four-port or six-port labels.

Preferably, the non-adhesive sections are narrower than the adhesive sections.

DETAILED DESCRIPTION OF PREFERRED EMBODIMENTS

The illustrated embodiments of the invention are directed to an adhesive pattern for labeling faceplates, surface mount boxes, patch panels and marker ties.

Figure 1:
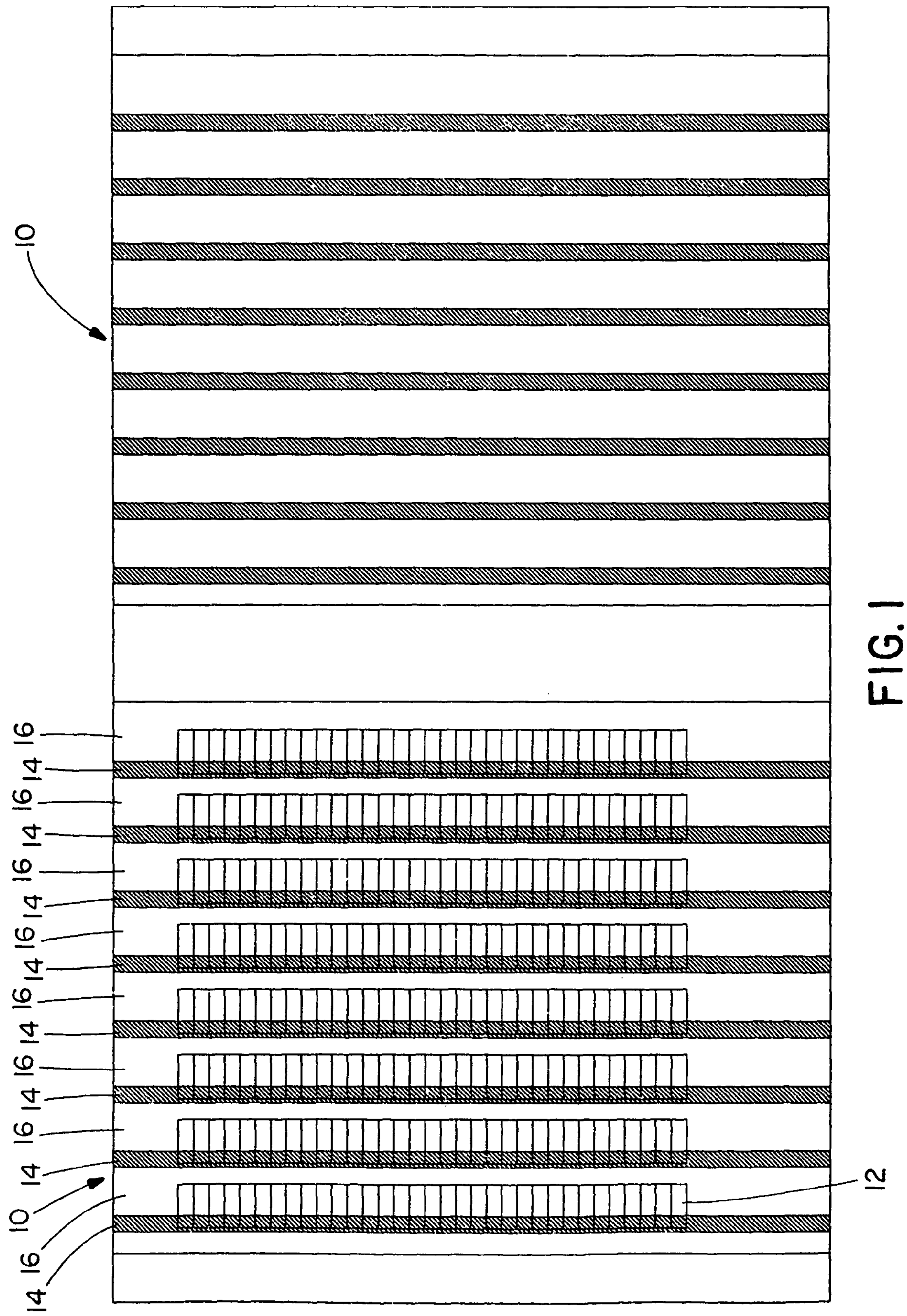
FIG. 1 is a plan view of an adhesive pattern of the present invention, showing one-port labels.

FIG. 1 shows an adhesive pattern 10 having eight columns of one-port labels 12. However, it is likewise contemplated that any number of columns of one-port labels 12 can be formed on the label sheet. Preferably, each one-port label is 0.236 inches in height and 0.68 inches in width. As shown in FIG. 1, two adhesive patterns are formed on a 20" wide continuous web. The web is die cut to form individual 8½×11 sheets, each having an adhesive pattern 10.

FIG. 1 shows adhesive pattern 10 having alternating non-adhesive and adhesive sections, such as non-adhesive section 14 and adhesive section 16. Preferably, non-adhesive section 14 is narrower than adhesive section 16. The left end of one-port labels 12 is attached to non-adhesive section 14, and the right end of one-port labels 12 is attached to adhesive section 16. Thus, one-port labels 12 should be removed from the label sheet by peeling each label from left to right, that is, from non-adhesive section 14 to adhesive section 16. Because of the label sheet composition, upon removal of one-port labels 12 from left to right, one-port labels 12 have a non-sticking surface. If one-port labels 12 are removed from right to left, that is, from adhesive section 16 to non-adhesive section 14, one-port labels 12 will have a sticking surface. The non-sticking label surface can be inserted in a pocket on a telecommunication device, such as a faceplate, patch panel, etc. A cover snaps over the label to retain the label therein.

Figure 2:
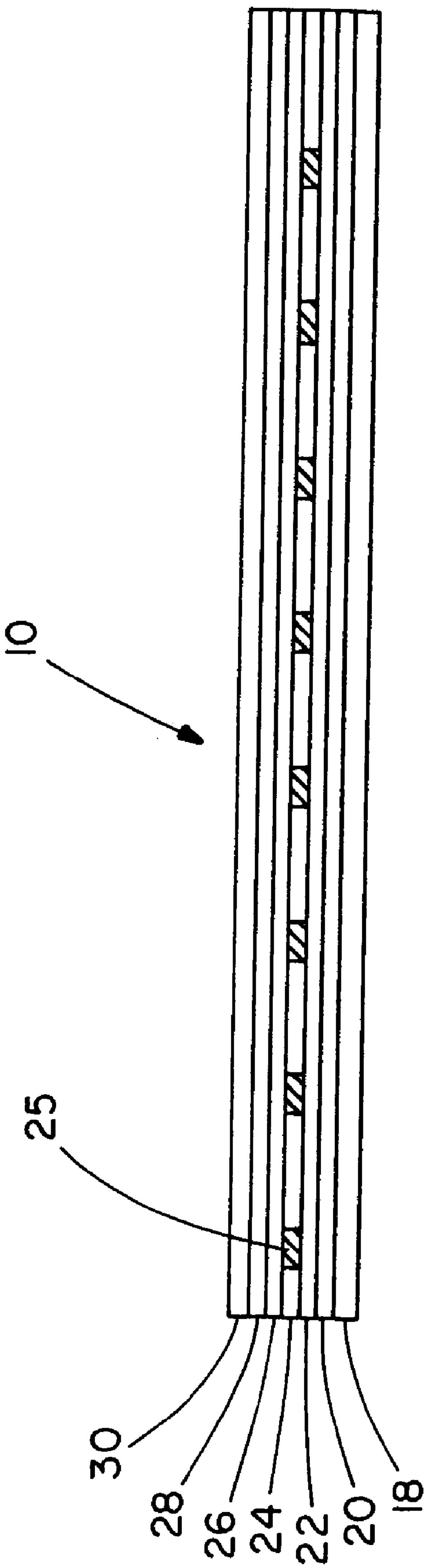
FIG. 2 is a cross-sectional view of the adhesive pattern of FIG. 1.

FIG. 2 shows a cross-sectional view of the label sheet adhesive pattern shown in FIG. 1. The label sheet comprises seven layers: 1) a twenty-eight pound liner 18; 2) a 0.0005 inch no tack dry adhesive layer 20; 3) a 0.001 inch polyester layer 22; 4) a hot melt adhesive layer 24 with non-adhesive sections 25; 5) a 0.001 inch polyester layer 26; 6) a 0.0005 inch pressure sensitive adhesive layer 28; and 7) a top liner 30. Top liner 30 is utilized to protect the label sheet during transportation. Thereafter, top liner 30 is removed and a 0.004 inch polyester layer is added to the label sheet. The label sheet is then die cut to the hot melt adhesive layer 24 to produce a sheet of one-port, two-port, three-port, four-port or six-port labels. The label sheet can also be die cut to produce a combination sheet having different label sizes, such as one-port, two-port, three-port, four-port and six-port labels.

Figure 3:
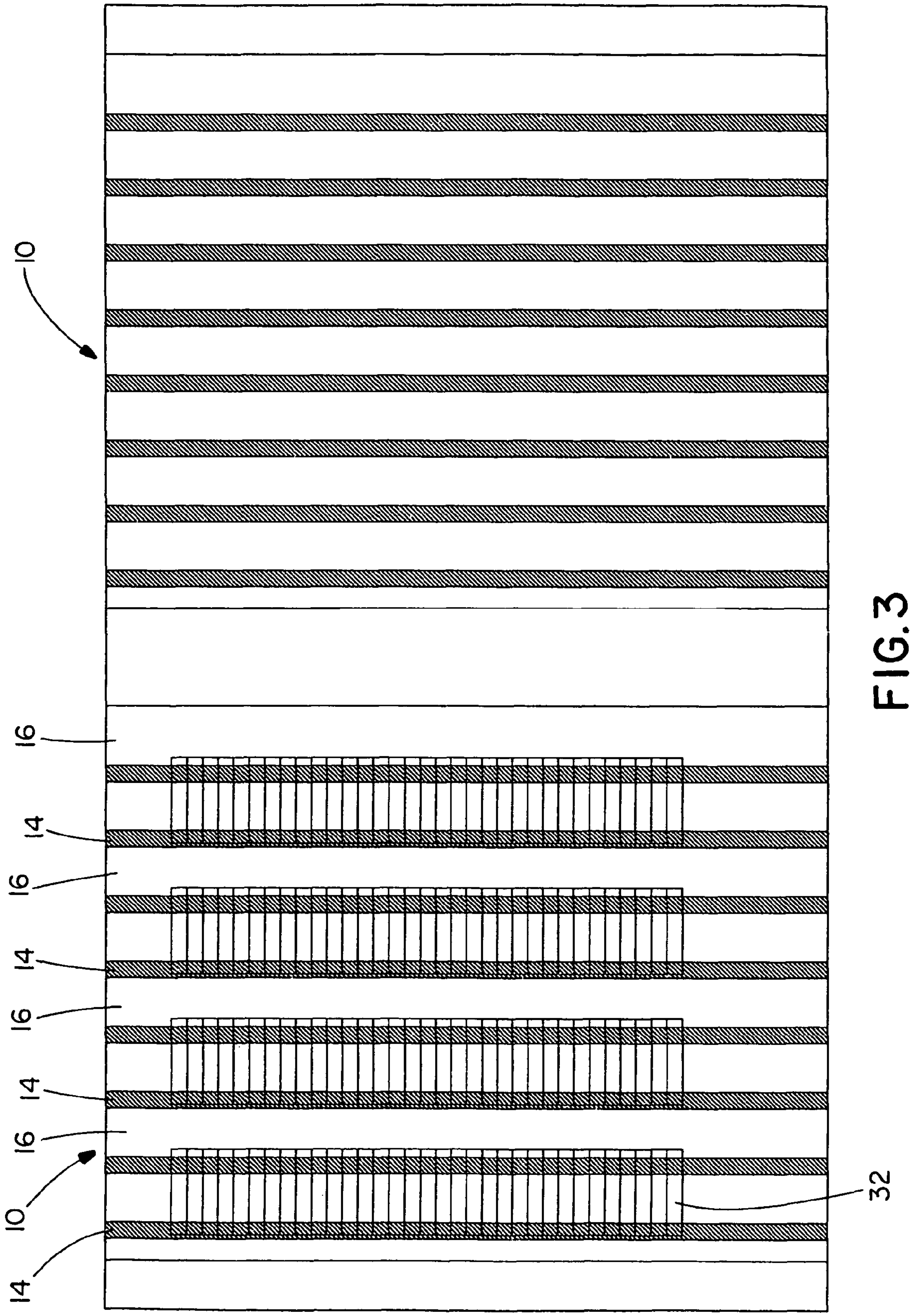
FIG. 3 is a plan view of the adhesive pattern of FIG. 1, showing two-port labels.

FIG. 3 shows adhesive pattern 10 having four columns of two-port labels 32. However, it is likewise contemplated that any number of columns of two-port labels 32 can be formed on the label sheet. Preferably, each two-port label is 0.236 inches in height and 1.315 inches in width. As in FIG. 1, the left end of two-port labels 32 is attached to non-adhesive section 14, and the right end of two-port labels 32 is attached to adhesive section 16. Thus, two-port labels 32 should be removed from left to right to achieve a non-sticking surface. If two-port labels 32 are removed from right to left, two-port labels 32 will have a sticking surface.

Figure 4:
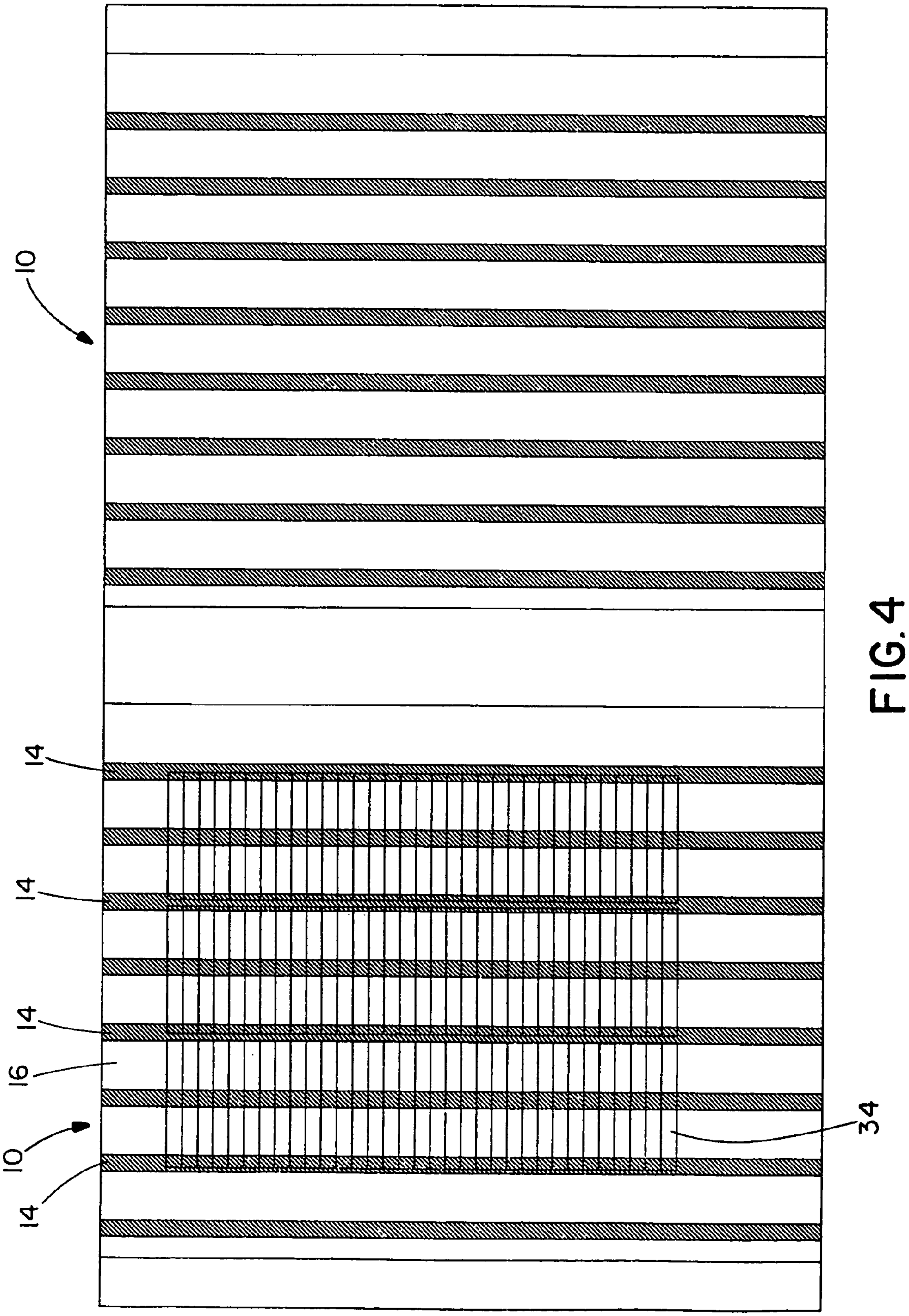
FIG. 4 is a plan view of the adhesive pattern of FIG. 1, showing three-port labels.

FIG. 4 shows adhesive pattern 10 having three columns of three-port labels 34. However, it is likewise contemplated that any number of columns of three-port labels 34 can be formed on the label sheet. Preferably, each three-port label is 0.236 inches in height and 1.95 inches in width. As in FIGS. 1 and 3, the left end of three-port labels 34 is attached to non-adhesive section 14, and in column one, the right end of three-port labels 34 is attached to adhesive section 16. Thus, in column one, three-port labels 34 should be removed from left to right to achieve a non-sticking surface. If three-port labels 34 are removed from right to left, three-port labels 34 will have a sticking surface. However, unlike in FIGS. 1 and 3, in columns two and three, the right end of three-port labels 34 is attached to non-adhesive section 14. Thus, in columns two and three, three-port labels 34 can be removed from left to right or from right to left to achieve a non-sticking surface.

Figure 5:
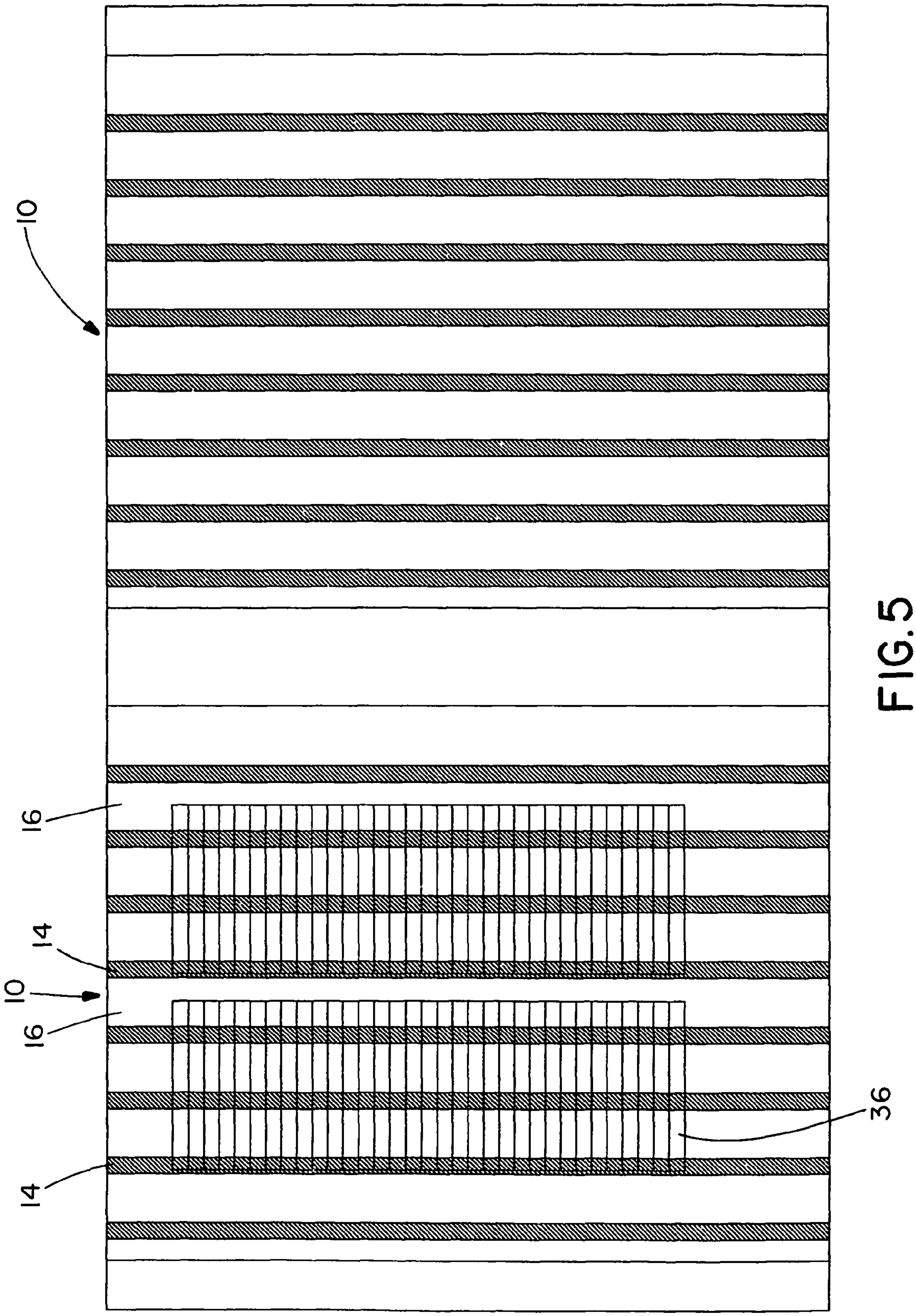
FIG. 5 is a plan view of the adhesive pattern of FIG. 1, showing four-port labels.

FIG. 5 shows adhesive pattern 10 having two columns of four-port labels 36. However, it is likewise contemplated that any number of columns of four-port labels 36 can be formed on the label sheet. Preferably, each four-port label is 0.236 inches in height and 2.585 inches in width. As in FIGS. 1 and 3, the left end of four-port labels 36 is attached to non-adhesive section 14, and the right end of four-port labels 36 is attached to adhesive section 16. Thus, four-port labels 36 should be removed from left to right to achieve a non-sticking surface. If four-port labels 36 are removed from right to left, four-port labels 36 will have a sticking surface.

Figure 6:
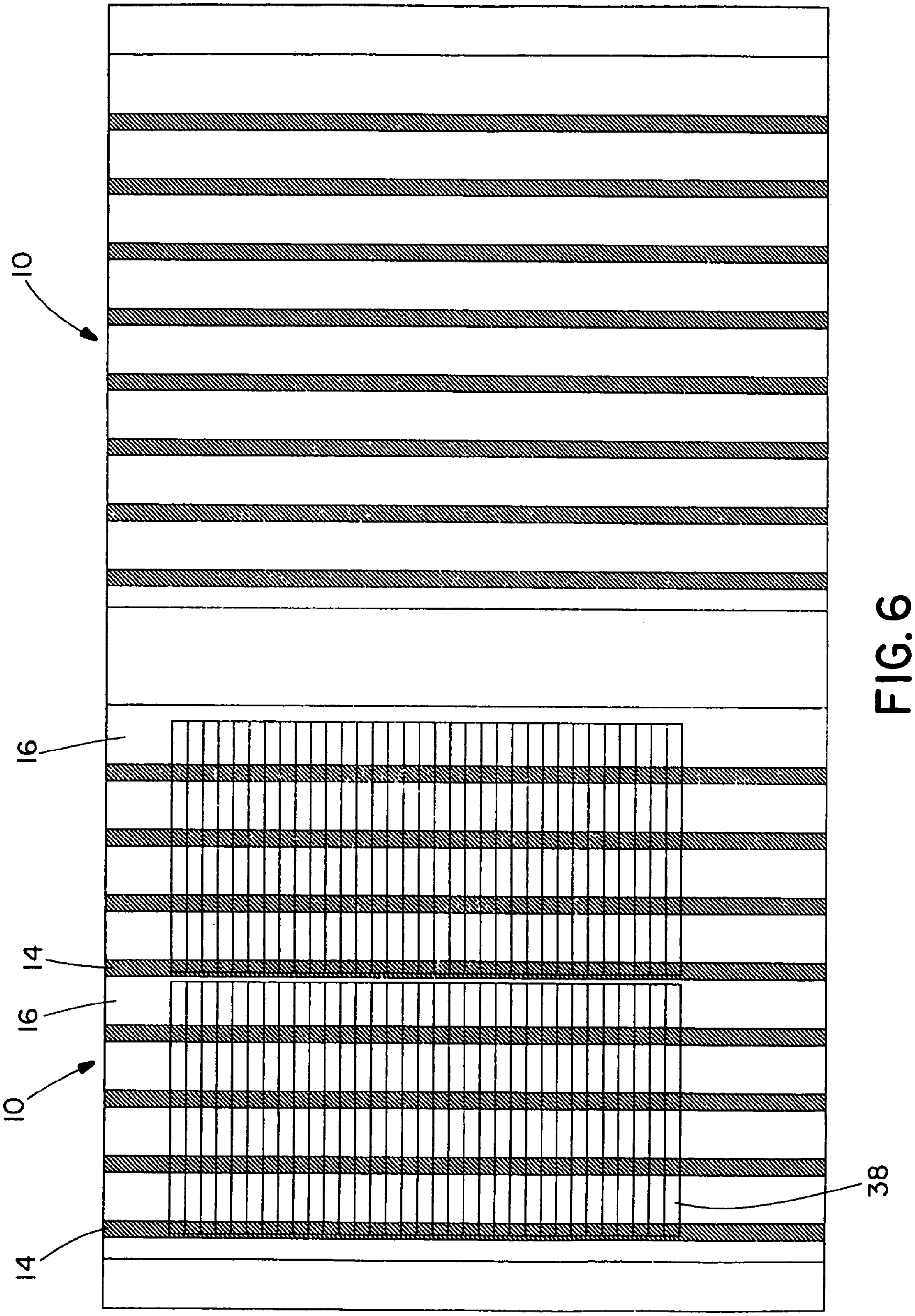
FIG. 6 is a plan view of the adhesive pattern of FIG. 1, showing six-port labels.

FIG. 6 shows adhesive pattern 10 having two columns of six-port labels 38. However, it is likewise contemplated that any number of columns of six-port labels 38 can be formed on the label sheet. Preferably, each six-port label is 0.236 inches in height and 3.855 inches in width. As in FIGS. 1, 3 and 5, the left end of six-port labels 38 is attached to non-adhesive section 14, and the right end of six-port labels 38 is attached to adhesive section 16. Thus, six-port labels 38 should be removed from left to right to achieve a non-sticking surface. If six-port labels 38 are removed from right to left, six-port labels 38 will have a sticking surface.

Figure 7:
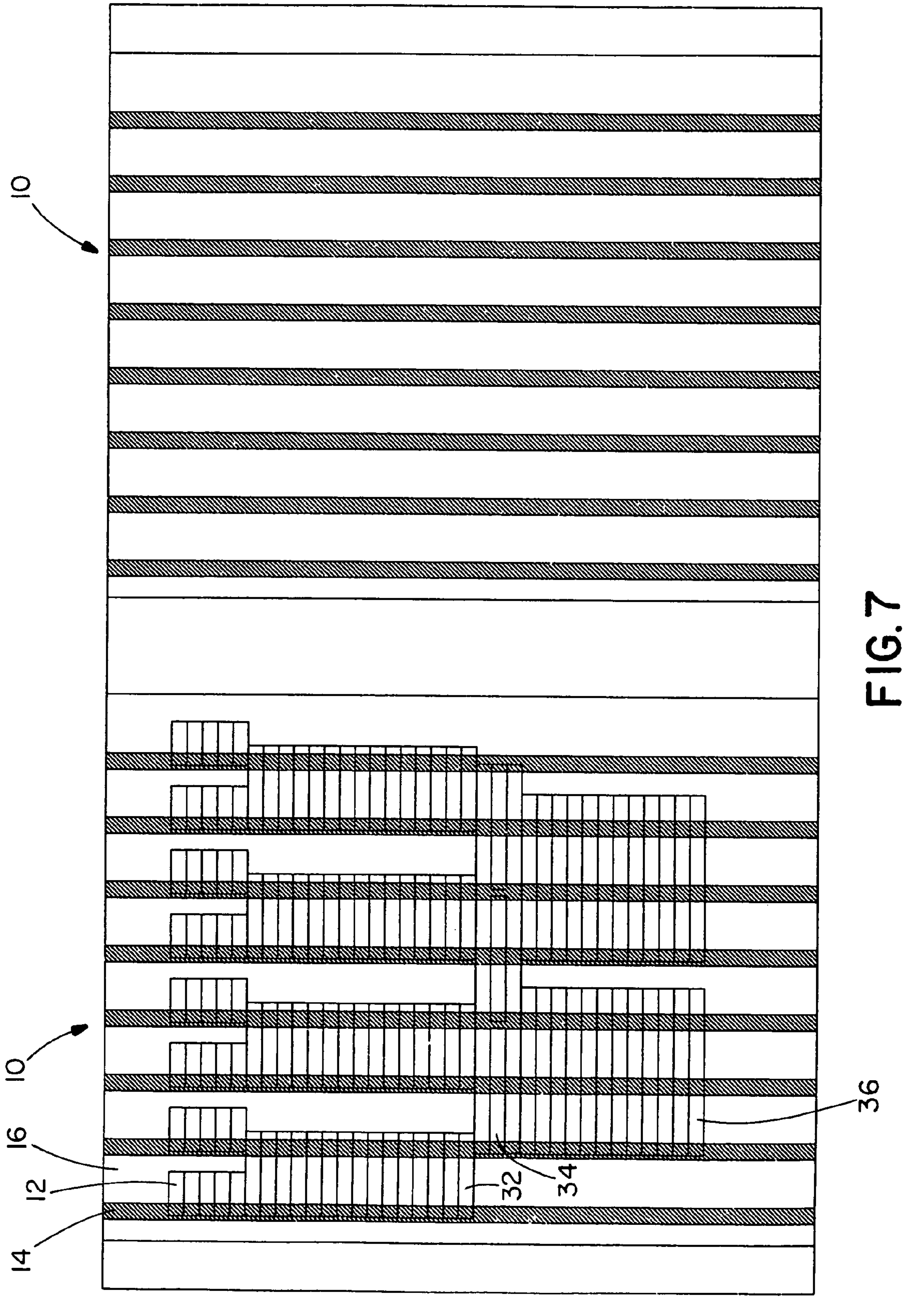
FIG. 7 is a plan view of the adhesive pattern of FIG. 1, showing a combination label sheet having one-port, two-port, three-port and four-port labels.

As described above, FIGS. 1-6 show adhesive pattern 10 having columns of one-port labels 12, two-port labels 32, three-port labels 34, four-port labels 36 and six-port labels 38. FIG. 7 shows adhesive pattern 10 having a combination of one-port labels 12, two-port labels 32, three-port labels 34 and four-port labels 36. However, it is likewise contemplated that six-port labels 38 can be provided in the combination label sheet.

The disclosed invention provides an adhesive pattern utilized on sheets of one-port, two-port, three-port, four-port and six-port labels, each sheet having only one label size, as well as on sheets having a combination of different label sizes. It should be noted that the above-described illustrated embodiments and preferred embodiments of the invention are not an exhaustive listing of the form such an adhesive pattern in accordance with the invention might take; rather, they serve as exemplary and illustrative of embodiments of the invention as presently understood. By way of example, and without limitation, the adhesive pattern can be utilized on a combination label sheet having any combination of the five different label sizes described above. Many other forms of the invention are believed to exist.

The invention claimed is:

1. A label sheet comprising:

a hot melt adhesive layer positioned between and in contact with a first layer and a second layer, the hot melt adhesive layer including a plurality of adhesive sections and a plurality of non-adhesive sections in an alternate arrangement; and a plurality of labels formed by cutting the label sheet through the first layer and to the hot melt adhesive layer, each label including a first edge and a second edge substantially parallel to the first edge, the first edge in contact with only an adhesive section and the second edge in contact with only a non-adhesive section.

2. The label sheet of claim 1, wherein the size of the labels are selected from the group consisting of one-port, two-port, three-port, four-port and six-port labels.

3. The label sheet of claim 1, wherein the label sheet comprises only one label size.

4. The label sheet of claim 1, wherein the label sheet comprises a plurality of label sizes.

5. The label sheet of claim 1, wherein the non-adhesive sections are narrower than the adhesive sections.

6. The label sheet of claim 1, wherein the first layer includes polyester.

7. The label sheet of claim 1, wherein the second layer includes polyester.

8. The label sheet of claim 1, further including a pressure sensitive adhesive layer positioned between and in contact with the first layer and a release liner.

9. The label sheet of claim 1, further including a pressure sensitive adhesive layer positioned between and in contact with the first layer and a third layer.

10. The label sheet of claim 9, wherein the third layer includes polyester.

11. The label sheet of claim 1, further including a no tack dry adhesive layer positioned between and in contact with the second layer and a base liner.

12. The label sheet of claim 11, wherein the base liner includes a twenty-eight pound liner.

* * * * *